United States Patent Office 3,619,907
Patented Nov. 16, 1971

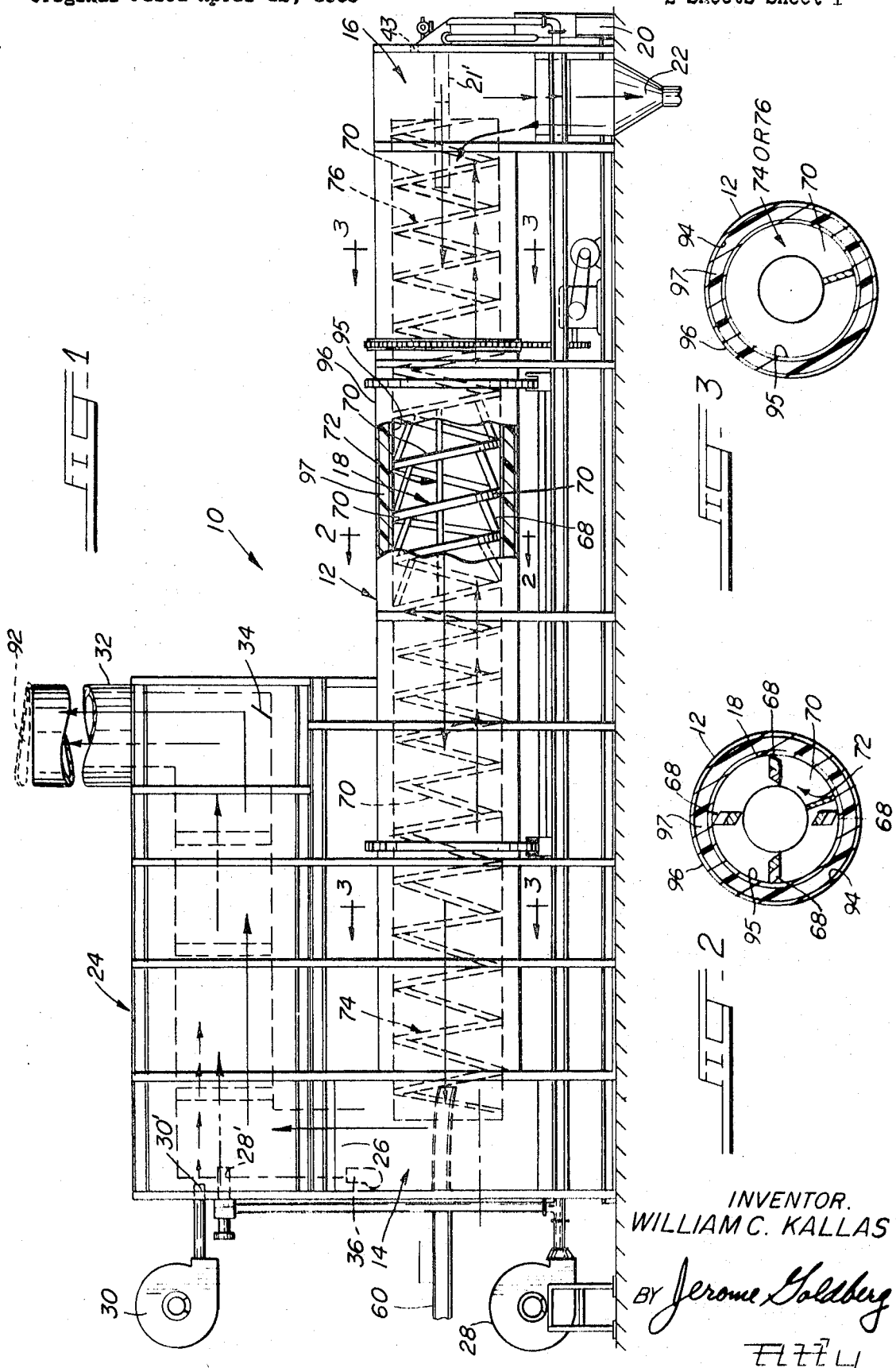

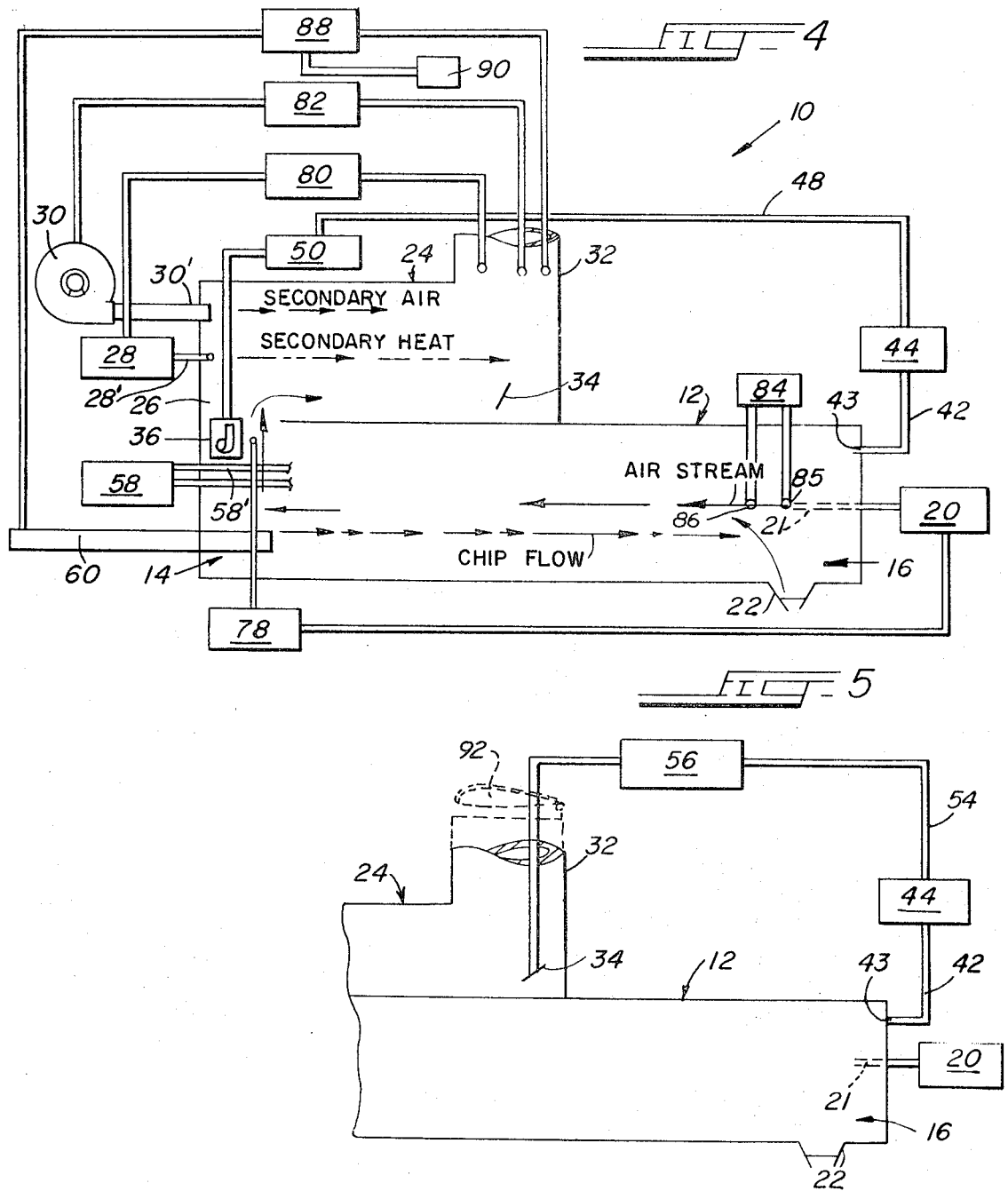

3,619,907
CHIP DRYER DEVICE
William C. Kallas, Park Ridge, Ill., assignor to Klefstad Engineering Co., Inc., Chicago, Ill.
Continuation of application Ser. No. 720,806, Apr. 12, 1968. This application June 8, 1970, Ser. No. 44,265
Int. Cl. F26b 13/10
U.S. Cl. 34—44                                26 Claims

ABSTRACT OF THE DISCLOSURE

A system for cleaning and drying metal chips having an air flow moving in an opposed relationship with respect to the movement of the metal chips. A spiral auger conveys the metal chips from an input end to an output end.

BACKGROUND OF THE INVENTION

This application is a continuation of my copending application, Ser. No. 720,806, filed Apr. 12, 1968, and now abandoned.

This invention relates generally to an apparatus for cleaning and drying metal chips, and more particularly relates to a system for cleaning and drying metal chips having the main air stream moving in an opposed relationship to the movement of the metal chips. Still more particularly, the invention relates to a system for burning oils and evaporating water from metal chips, and includes means for removing exhaust gases adjacent to the input for the wet and oily chips.

It is desirable for economic reasons to salvage the metal chips or scrap materials accumulated from milling, boring, drilling and other metal forming operations. In these operations, lubricating and cooling oils are used, which adhere to the scrap and are extremely difficult to thoroughly remove. Various systems or installations have been devised for removing these adhering oils. For example, burners with open flames were positioned in a rotating drum to burn away the oil from the scrap material. These open flames caused uncontrollable burning, and frequently the temperature in the drum would rise so high, that it was necessary to substantially decrease the throughput to uneconomical levels in order to prevent the metal from melting or oxidizing.

In another system previously used, the scrap materials were fed from an entry point to an exit point of a rotatable drum. Burning means were provided to produce combustion of the oils adjacent the entry point. An air inlet and exhaust means created a gas flow in the direction of scrap feed. An undesirable feature of this system was the tendency of the dry metal particles or chips of scrap to be lifted into the air stream and discharged with the exhaust gases. In an apparent attempt to alleviate this problem, a prior similar system directed the air stream in an opposed relationship with the scrap feed. Although some improvement, there was still appreciably quantities of metal chips lifted into the air stream, due primarily to the large air draft at the entry point sucking the chips dried by the combustion or burning occurring there.

The invention herein, overcomes the aforedescribed problems by providing a system having means to control the heat and fire from the combustion of the oils without reducing the throughput of the metals being treated. The invention also provides safeguards to reduce air pollution and to prevent the metal chips from being lifted into the air stream.

SUMMARY OF THE INVENTION

The device for cleaning and drying metal chips of this invention, provides a drum in which metal chips are transported from an input end to an output end. Heat means at the output end cause combustion of the oils on the metal chips. Air input and exhaust means drive the air in a direction opposite to the chip feed, and cause the air draft to be greatest at the input end and substantially less at the output end, where the chips are dry and thus lightest in weight. In this air flow arrangement, metal chips are not susceptible to be lifted into the air stream.

Another feature of the invention is to provide means in the intermediate section of a spiral auger which causes the metal chips to vary in position and tumble for a brief period of time into the heated air stream passing from the output end to the input end of the drum.

Another feature of the invention is to provide an air sensing means to maintain the air velocity of a drum through an air input part disposed at the end of a drum where the treated metal chips are discharged.

Still another feature is to provide a water injection means to inject water into the drum at the input and for the metal chips to control heat and prevent combustion and flaming of oils from occurring directly at the input end. Thus, the wet and oily metal chips are not susceptible of being dried at the input end and lifted into the exhaust air stream. By controlling the heat and location of the combustion, the smoke and fumes being discharged is minimized.

Accordingly, it is the primary object of this invention to provide a device to efficiently and thoroughly clean and dry wet and oily chips.

Another primary object is to provide a device for cleaning metal chips, in which the metal chips are not susceptible of being lifted into the air stream and discharged with the exhaust gases while being treated.

Another object is to provide a metal chip cleaning device having the metal chip feed in one direction and the air stream flow in the opposite direction.

Another object is to provide a metal chip cleaning device an input for heat adjacent the output end for the metal chips.

Another object is to provide a device having minimum air draft at the output and for the metal chips, where the metal chips are dry and most likely to be lifted into the air stream.

Another object is to provide sensing means for maintaining a constant air velocity into the system.

Another object is to provide sensing means for maintaining heat in the device substantially constant.

Another object is to provide an afterburner chamber to further burn and disintegrate the oily fumes and smoke caused by the burning of the oils on the metal chips.

Still another object is to provide a water injection means controlled by the heat adjacent the input end for the metal chips to inject water into the system when the heat exceeds a predetermined temperature and thereby prevent combustion and burning of the chips adjacent the input end.

Still another object is to provide a water injection means controlled by the heat adjacent the output end for the metal chips.

Still another object is to control the input rate of metal chips into the system by the temperature in the exhaust stack of the system's afterburner chamber.

With the foregoing and other objects in view which will appear as the description proceeds, the invention consists of certain novel features of construction, arrangement, and a combination of parts hereinafter fully described, illustrated in the accompanying drawings, and particularly pointed out in the appended claims, it being understood that various changes in the form, proportion, size and minor details of the structure may be made

BRIEF DESCRIPTION OF THE DRAWINGS

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the overall figures of the drawings;

FIG. 1 is a side elevational view of a device for cleaning oily metal chips, embodying the principles of the invention;

FIG. 2 is a section view taken on the plane of line 2—2 in FIG. 1, viewed in the direction indicated, and showing the bar members in the intermediate section of the auger;

FIG. 3 is a sectional view, taken on the plane of the line 3—3 in FIG. 1, viewed in the direction indicated and showing the front and rear sections of the auger without bar members;

FIG. 4 is a block diagram illustrating system operation; and

FIG. 5 is a partial block diagram of the operation of the device to illustrate alternate means for maintaining the air input velocity into the drum substantially constant.

DESCRIPTION OF THE PREFERRED EMBODIMENTS

Referring now to the various figures of the drawings, the reference numeral 10 indicates generally a system embodying the principles of the invention, for treating and cleaning oily metal chips or scraps of material. The system 10 comprises an elongated rotating drum 12 having an input end 14 to receive wet and oily metal chips and an output end 16 for discharging the treated metal chips after moisture and oils have been removed by evaporization, burning or vaporization.

An elongated screw or spiral auger 18 extends longitudinally with the drum 12 between the input end 14 and the output end 16. The auger 18 is rigidly secured inside the drum 12. The rotation of the drum 12 causes the metal chips to be transferred through the auger 18 from the input end 14 toward the output end 16 at a controlled ratio of movement, and thereby functioning as a conveyer. The operation of the auger 18 will be more fully referred to later in the description. The long and short arrow lines in FIG. 1 illustrate the path of movement for the metal chips.

A main air furnace 20 (FIGS. 1 and 4) is located adjacent the output end 16. Air furnace 20 heats air to a predetermined temperature. The heated air is ejected through a conduit 21 from the furnace 20 into the output end 16 of the drum 12.

An output chute 22 is located at the output end 16 of the drum. The treated metal chips are discharged by the auger 18 from the output end 16 into chute 22 and finally into a receiving bin or conveyor means (not shown). Air sucked up through the chute provides the primary air source for the air flow into the system, and additional oxygen for the combustion of the oils on the metal chips. The system air flow comprising the air from the chute and the heated air, illustrated in FIGS. 1 and 4 by long arrow lines, is in opposition to the metal chip flow.

An afterburner chamber 24 (FIGS. 1, 4 and 5) is disposed above the drum 12. An opening 26 formed in the front end of the afterburner chamber 24, provides an entranceway for the passage of smoke and fumes from the input end 14 of the drum 12 into the input of chamber 24. Other positions for the afterburner than the position shown in the drawings may be suitable, provided that the input to the afterburner is only a short distance from the input end 14 of the drum.

A secondary air furnace or burner 28 (FIGS. 1 and 4) ejects heated air through a conduit 28' into the front of the afterburner chamber 24 adjacent the opening 26. A blower means 30 drives secondary air through an air inlet 30' into the front of the afterburner chamber 24. The cooperation of the heated air from the secondary furnace 28 with the oxygen from the secondary air causes combustion of the oily fumes and smoke in the air stream. Thus, the smoke and fumes in the air caused from the burning and vaporization of the oils on the metal chips inside the drum, are further burned and disintegrated in the afterburner chamber 24. The heated air from the secondary air furnace is illustrated by broken lines, and the secondary air from input port 30 is illustrated by short arrow lines (FIGS. 1 and 4).

A discharge stack 32 (FIGS. 1, 4 and 5) extends upward from the top of the afterburner chamber 24 at its back end. The outer end of the discharge stack 32 is open. A damper 34 (FIGS. 4 and 5) is positioned in the downstream side of stack 32 primarily for controlling the air draft velocity through the chamber 24. A decrease in the opening of the damper 34 increases the air draft velocity, and an increase in the damper opening decreases the air draft velocity. Substantial variations in the opening of the damper 34 may also appreciably change the air velocity through the system 10.

The exhaust fan 36 (FIGS. 1 and 4) is disposed between the input end 14 of the drum 12 and the opening 26 leading into the afterburner chamber 24. The exhaust fan 36 draws the smoke and fumes from the drum into the afterburner chamber. Variation in the operating speed of the exhaust fan 36 provides control of the air draft velocity through the drum 12.

Since the exhaust fan 36 is positioned adjacent the input end 14 of the drum 12, the strongest air draft exists where the chips are inserted into the drum. At the input end of the drum, the chips are wet and therefore heavier and more cohesively associated with one another than at any other location in the drum. Thus, at the point of maximum air draft, there is the least tendency for the chips to be lifted into the air stream and discharge with the exhaust gases.

An air port 43 is formed in the back end wall of the drum 12 at the output end 16. Port 43 provides an air pathway for the purpose of sampling air velocity. A tubular member 42 (FIGS. 4 and 5) communicates the air port 43 with an air sensing means 44. The air sensing means 44 may comprise a balancing apparatus (not shown) which varies with the velocity or increment of velocity of the air passing through the air port 43. The balancing apparatus is set to null or balance at a predetermined velocity of air passing through the air port 43 which corresponds to the desired air velocity at the output end 16. The balancing apparatus may comprise a wind vane device whereby the amount of deflection is proportional to air velocity.

A connecting member 48 (FIG. 4) connects the air sensing means 44 to a fan control means 50. A connector 52 connects the fan control means 50 with the air exhaust fan 36. The cooperation of the fan control means 50 with the air sensing means 44 may cause the speed of the exhaust fan 36 to vary with changes in the velocity of the air flowing into the system, until the desired air velocity into the system is reached. Thus, a decrease in the air velocity through port 43 automatically causes the speed of the exhaust fan 36 to increase, thereby increasing the air draft in the system which increases the velocity of the air flowing through port 43, until the sensing means 44 is balanced at the desired constant air velocity. Conversely, an increase in the input air velocity through port 43 causes the speed of the exhaust fan to decrease the air draft, whereby the input velocity through port 43 decreases until again reaching the desired constant value.

Alternatively, instead of the sensing means being connected to the exhaust fan 36, a coupling member 54 may connect the air sensing means 44 to a stack control means 56, as shown in FIG. 5. The stack control means 56 is mechanically linked to the damper 34 and automatically varies the damper opening to compensate for changes in the air velocity through port 43 to maintain the air velocity at the output end 16 substantially constant. Therefore, if the velocity through air port 43 increases to unbalance the balancing apparatus of air sensing means 44, the stack control means 56 automatically increases the damper 34 opening; thereby decreasing the system air draft until the velocity through port 43 is returned to the constant value. Conversely, if the velocity in the system decreases, the opening of damper 34, in the same manner, would now be caused to decrease in size; thereby decreasing the system air draft until the velocity through port 43 again reaches the constant value.

A temperature controlled water injection means 58 (FIG. 4) is located at the input end 14. The heat sensed by a heat senser 58' at the input end 14 controls the water injection means 58. The water injection means 58 is triggered "on" from a water "off" position when the heat in the drum 12 or the heat from flames (created by the combination of the oils) propagating back toward the input end reaches a predetermined temperature level. The water flow from the injection means 58 is set to gradually increase with increases in temperature from said predetermined level, and the water flow gradually decreases with decreases in temperature until reaching the water "off" position. Thus, the amount of water injected into the system is proportional to the heat intensity of flames inside the drum. In this manner, precise and safe control of heat inside the system particularly at input end 14, may be maintained.

The metal chips to be treated are transported on a conveyor trough 60 where they are deposited into the input end 14. The chips may be vibrated or shaken from the trough 60 into the drum 12. The chips are transferred by the spiral auger 18, as the drum 12 rotates, from the input end 14 to the output end 16. Preferably, each rotation of the drum advances the chips a distance of one pitch along the spiral auger 18.

A plurality of bar members 68 (FIGS. 1 and 2) extend between adjacent spiral fins 70 in the intermediate section 72 of the spiral auger 18. The bar members 68 cause the chips to tumble and vary in position as the drum rotates. Although various arrangements may be used, the embodiment illustrated in the figures show four bar members 68 spaced 90 degrees apart between adjacent fins 70 in the auger 18 intermediate section 72.

No bar members 68 are inserted in the front section 74 or the rear section 76 of the auger 18. Since the fins 70 extend to the inside cylindrical surface of the drum 12, tumbling of the metal chips occurs only in the intermediate section 72 where the bar members 68 are present. During the period of tumbling, the metal chips are exposed to the direct heat of the air stream. This insures proper drying of the chips by the time they reach the output end 16.

Some of the lighter tumbling chips are carried back toward the input end 14 by the air stream before dropping out of the air stream and into the confines of the fins 70 of the auger 18. Those chips that fall out of the air stream and into the front section 74 of the auger, are reconveyed by the auger 18 into the intermediate section 72. Since no tumbling occurs in the front section 74 of the auger 18, where the air draft is the greatest, or in the rear section where the metal chips are dry and therefore the lightest, the air exhaust leading into the afterburner chamber 24 and finally discharged from the stack 32 is substantially free of any metal chips.

A main heat control means 78 is connected to the main air furnace 20 and senses the temperature of the exhaust gases adjacent the opening 26 into the afterburner chamber 24. Heat control means 78 automatically increases or decreases the heat input into the output end 16 from the air furnace 20, if the temperature of the exhaust gases varies from a predetermined level. This feedback loop maintains the temperature of the gases flowing into the chamber 24 substantially constant at the predetermined level.

An afterburner heat control means 80 is coupled to the secondary air furnace 28. Heat control means 80 senses the temperature of the exhaust gases in the stack 32.

A secondary air control means 82 also senses the temperature in the stack 32. Air control means 82 is connected to the secondary air blower 30.

A decrease in stack temperature below a first predetermined level causes the air control means 82 to turn-off the secondary air input. An increase in stack temperature above a second predetermined level causes the heat control means 80 to turn-off the secondary heat input. Between the first and second predetermined temperature levels, the secondary heat input and secondary air input are "on." The combined action of the heat control means 80 and air control means 82 maintains the temperature of the exhaust gases in the stack 32 at substantially a constant temperature range, and also minimizes the secondary heat input into the chamber 24 required to further burn the oily fumes and smoke before their discharge from the stack 32.

Alternatively, the heat control means 80 and the air control means 82 may act simultaneously. Thus, a decrease in stack temperature from a predetermined operating temperature level is sensed by the heat control means 80 and the air control means 82, causing respectively an increase in secondary heat input from the secondary air furnace 28 and a decrease of secondary air input from the blower 30. Conversely, an increase in stack temperature from the predetermined temperature level is sensed by the heat control means 80 and the air control means 82, causing respectively a decrease of secondary heat input and increase in secondary air input.

An output water injection means 84 (FIG. 4) is located at the output end 16. The water injection means comprises a heat senser 85 and a water injection nozzle 86. The output water means 84 is triggered "on" to inject water into the output end 16 when the heat in the drum 12 at the ouput end or the intensity of the flame reaches a predetermined temperature level. The water flow from the injection nozzle 86 may be set to gradually increase with increases in temperature from said predetermined level, and to gradually decrease with decreases in temperature until reaching a water "off" position when the temperature falls below the predetermined level.

Thus, the amount of water injected into the drum is proportional to the heat intensity at the output end 16.

A speed control means 88 (FIG. 4) is associated with a drive means (not shown) of the conveyor 60 on which the wet and oily chips are conveyed for inserting into the input end 14 of the drum 12. The speed control means 88 includes a heat senser 89 positioned inside the stack 32. Originally, the feed rate of the chips into the drum 12 is preset to an optimum minimum rate for the system. When the temperature in the stack reaches a predetermined high level, the speed control means 88 causes the conveyor speed to decrease in order to decrease the feed rate of the metal chips and thereby reduce the amount of oil being introduced into the system.

The speed control means 88 is set to trigger "on" for reducing the input feed when the heat from the oil input exceeds the safety capability of the system. When the stack temperature substantially increases, due primarily to insufficient secondary air, the speed control means 88 causes the input feed rate to decrease. The secondary air may be insufficient, although the secondary air control means 82 may be driving the blower 30 at its maximum air injection rate.

The speed senser means 88 may comprise a temperature controlled switch which closes when the temperature in the stack exceeds a predetermined temperature level and reopens when the temperature level falls below the predetermined temperature level. The closing of the switch causes the speed of the conveyor 60 to be decreased to a predetermined first speed rate. A timer 90 is associated with the speed senser means 88 and is triggered "on" for a preselected time interval. If after the time interval the switch is still closed, the speed of conveyor 60 is caused to be decreased to a second speed rate, slower than the first rate. The timer 90 is again triggered "on" for another time interval. If at the end of this time interval, the switch is still closed, the conveyor is caused to decrease to another preset speed which is slower than the first speed. The speed decreasing operations are continued until the switch opens. For substantial quantities of oil inside the drum, speed senser means 88 may even cause the conveyor 60 to stop entirely, until the temperature falls below the predetermined temperature level.

When the switch opens, the inverse sequence of operations occurs. The speed of conveyor 60 is increased and the timer is triggered "on." If at the end of the time interval, the switch is still open, the speed of the conveyor is advanced to the next preset conveyor speed. However, if the switch closes again, the conveyor speed is decreased to the next slower speed. The variations in the rate of input feed continues until the temperature in stack 32 stabilizes below the predetermined temperature level, and the conveyor returns to its original speed.

A damper 92 may also be positioned at the outer end of the stack 32 as shown in phantom in FIGS. 1 and 5. A decrease in the opening of the damper 92 decreases the air draft velocity and an increase in the opening of the damper 92 increases the air draft velocity.

A space 94 separates the inner surface 95 and outer surface 96 of the drum 12. Non-inflammable insulation 97 is inserted in the space 94.

OPERATION

In the operation of the system 10, oily metal chips are inserted at the input end 14 of the drum 12. As the drum rotates, the chips are conveyed by the spiral auger 18 to the output end 16 where clean and dry chips are discharged into the discharge chute 22 for passage out of the drum. As the drum 12 rotates, the chips are pushed along the bottom of the drum by the fins 70 of the auger except in the intermediate area 72 where the bars 68 cause the chips to be lifted into the air stream. A draft of heated air is ejected into the system at the output end 16 of the drum by the air furnace 20.

The exhaust fan 36 being positioned adjacent the input end 14 of the drum, pulls the main air stream of the system comprising the air from the discharge chute 22 and the heated air from the air furnace 20, from the output end 16 toward the input end 14. The direction of main air stream flow is opposed to the direction of the metal chip flow (FIGS. 1 and 4).

In the normal operation of the system 10, most of the oxygen is consumed in the combustion of the oils by the time the main air stream reaches the input end 14. Therefore, at the input end 14, the oxygen is generally insufficient to support any substantial combustion. As a further safeguard against combustion and uncontrollable burning at the input end, the water injection means 58 is triggered "on" from intense heat of flame propagating toward the input end or when the heat at the input end of the drum rises to a combustible temperature level.

When the metal chips are inserted into the input end 14, they are wet and oily. The chips are heavier and more cohesively associated together at the input end 14 than at any other location in the system. Hence, due to the cohesive association of the chips and the safeguards at the input end 14 for preventing combustion, the metal chips are not lifted into the exhaust air stream flowing into the afterburner chamber 24.

The sensing means 44 senses the velocity of the air passing through port 43. If, for example, the heated air is increased and/or the amount of water input (not shown) is increased, the air velocity through port 43 decreases from a predetermined velocity. This is due primarily to the exhaust fan being unable to discharge the increase of gases in the system. The sensing means 44 sensing the decrease of air velocity through port 43, causes the speed of the exhaust fan 36 to increase, which in turn increases the air velocity through port 43. The speed of the exhaust fan 36 is varied until the velocity through port 43 stabilizes at the predetermined level. Thus, the velocity of the air stream at the output end 16 and through port 43 is maintained substantially constant.

Alternatively, as shown in FIG. 5, the sensing means 44 may be associated with the damper 34 in the stack 32. A decrease in air velocity through port 43 from a predetermined velocity is sensed by the sensing means 44 which causes the size of the opening of the damper 34 to decrease and the air velocity at the output end 16 to increase back to the predetermined velocity. Conversely, an increase in air velocity caused by the sensing means 44 causes the damper opening to increase, whereby the velocity at the output decreases back to the predetermined level.

The heat control means 78 maintains the temperature of the gases adjacent the input end 14 substantially constant by varying the heated air input from furnace 20. When there is an increase in temperature from a predetermined temperature level, at the input end, control means 78 causes a decrease in heated air input. When there is a decrease in temperature from predetermined level, control means 78 causes an increase in the input of heated air.

Heat control means 80 senses the temperature of the exhaust gases in stack 32. When the temperature in the stack 32 rises from a predetermined temperature level, heat control means 80 causes the secondary heat input from furnace 28 to either decrease or turn off completely. The air control means 82 also senses the temperature of the exhaust gases in stack 32, and causes the secondary air to either decrease or turn off when the temperature in the stack falls below a predetermined level. The heat control means 80 and the air control means 82 may act simultaneously, whereby the heated air input increases and the secondary air input decreases when stack temperature falls below the predetermined level, and the heated air input decreases and the secondary air input increases when the stack temperature rises above a predetermined level.

The speed senser means 88 provides still further control over the heat intensity generated in system 10. When the temperature of the exhaust gases in stack 32 exceeds a predetermined temperature level, the speed means 88 causes the input feed of metal chips from the conveyor 60 to decrease from a predetermined feed rate. The input feed is progressively decreased until the temperature in the stack 32 stabilizes below the predetermined temperature level. Preferably, the temperature level triggering the speed senser 88 should be greater than the temperature which causes the heat senser means 80 to turn "off" the secondary air input.

The output water injection means 84 provides a control for regulating the heat at the output end 16. Thus, if the heat or intensity of the flames increases above a predetermined temperature level, water is ejected in the output end 16, preferably at a gradually increasing rate with increases in temperature at a gradually decreasing rate with decreases in temperature until finally turning "off" when the temperature falls below the predetermined water trigger temperature.

Control means are provided to prevent burning at the input end 14. The heat control means 78 senses the heat at the input end 14 and reduces the heat ejected into the drum at the output end 16, if the temperature of the gases adjacent the input end 14 approaches the combustible temperature. The water injection means 58 ejects water into the input end 14 when the heat sensed indicates that burning at the input end could occur. The increase of the speed of the exhaust fan 36 caused by the sensing means 44, when the velocity of air at the output end 16 decreases due generally to an increase in exhaust gases, is still a further safeguard to prevent or minimize the occurrence of burning at the input.

The heat control means 78, afterburner heat control means 80 and the air control means 82 may convert temperature indications into electrical signals. These electrical signals may drive a motor or other mechanical control means which controls the heated air flow into the system from the air furnace 20 or 28 or the input air flow from the blower 30.

Alternatively, the heat control means 78 and 80 and the air control means 82 may convert temperature indications into mechanical pressure. Such pressure may drive a cylinder or other mechanical control means in an inward or outward direction and thereby control the opening or closing of a damper (not shown) which controls the gas or air flow into the system, from the air furnace 20 or 28 or blower 30. The pressure for controlling the damper may be converted from electrical signals corresponding to temperature variations.

The air sensing means 44 in addition or instead of sensing velocity may be used to sense air pressure through port 43. The pressure through port 43 may be approximated by the formula:

$$\text{Pressure} = 1.78 \frac{(\text{velocity})^2}{4005}$$

The air pressure or velocity variations through port 43 may be converted to electrical signal variations or mechanical force variations for controlling the capacity of exhaust fan 35 to pull the exhaust gases out of the drum 12.

The fan control means 50 (FIG. 4) may respond to electrical signals corresponding to velocity or pressure through port 43 to cause the motor speed of the exhaust fan 36 to increase or decrease. The fan control means 50 may respond to mechanical force variations and cause an air exhaust damper (not shown) to open or close, and thereby control the amount of air exhaust per unit time. Such mechanical force may be converted from electrical signals corresponding to air velocity or air pressure variations through port 43. The air flow capacity of the exhaust fan 36 is determined by motor speed and the dimension of the air exhaust damper opening. Therefore, the capacity may be varied by changing the damper opening and maintaining the speed of the fan constant or changing the speed of the fan and maintaining the damper opening constant.

The temperature of the heated air input from furnace 20 varies with the kind of metal chips or scraps being processed. Thus, heated air input from the main furnace 20 may be set at approximately 400 to 700 degrees Fahrenheit for brass, 400 to 800 degrees Fahrenheit for aluminum, and 400 to 1,500 degrees Fahrenheit for steel.

The invention herein, by substantially eliminating the possibility of the metal chips being lifted into the main air stream carrying the exhaust gases, appreciably reduces harmful air pollution and increases system efficiency. Moreover, by providing positive heat controls, uncontrollable burning of the oils is prevented, which still further reduces air pollution.

It is believed that my invention, its mode of operation, construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

I claim:

1. In a device for cleaning metal chips including a drum having an input end and an output end, transport means for conveying the metal chips from the input end to the output end, the herein improvement comprising: heat input means to cause the burning and vaporization of oils on said chips; an air input means and an air exhaust means causing an air stream to move in an opposed relationship with respect to the chip movement, said air stream carrying exhaust gases created from said burning and vaporization of oil out of said drum, conveyor means for conveying wet and oily metal chips into the drum at the input end thereof, and a speed control means associated with said conveyor means, said speed control means comprising a heat senser positioned to sense the heat of said exhaust gases, said speed control means causing said conveyor means to decrease in speed when said heat senser indicates that the heat of the exhaust gases has reached a predetermined temperature level.

2. The device of claim 1 wherein said speed control means comprises a temperature controlled switch which closes when the heat of the exhaust gases reaches said predetermined temperature level and opens when the heat falls below said temperature level, the closing of said switch causing the speed control means to decrease the speed of the conveyor to a first slower speed; and a timer means is associated with the speed control means and is triggered "on" for a predetermined interval of time after said predetermined temperature is reached, said speed control means causing said conveyor means to decrease to a second slower speed slower than said first slower speed if the temperature of said exhaust gases exceeds said temperature level after said time interval.

3. The device of claim 1 wherein a port is disposed adjacent the output end of the drum; an air sensing means is associated with the port and said exhaust means, said air sensing means causing said exhaust means to increase the velocity of the exhaust gases flowing out from the device when the velocity of the air flowing through the port decreases below a predetermined velocity, said air sensing means causing said exhaust means to decrease the velocity of the said exhaust gases when the velocity of the air flowing through the port increases from the predetermined velocity level; said transport means for the metal chips comprises an elongated spiral member having a plurality of fins, said spiral member being disposed inside said drum, said drum being rotatable whereby the chips are conveyed through the spiral member from the input end to the output end, said spiral member having a front portion, an intermediate portion and a rear portion; and spaced apart bar members extending from one fin to an adjacent fin in only the intermediate portion of the spiral member, the bar members causing the chips to tumble as said drum rotates.

4. In a device for cleaning metal chips including a drum having an input end and an output end, transport means for conveying the metal chips from the input end to the output end, the herein improvement comprising: heat input means in said drum to provide heat to cause the burning and vaporization of oils on said chips; and an air input means and an air exhaust means causing an air stream to move in an opposed relationship with respect to the chip movement, said air stream carrying exhaust gases created from said burning and vaporization of oil out of said drum, and a water injection means, said water injection means sensing the heat adjacent said input end and injecting water into the drum when the heat exceeds a predetermined temperature, the quantity of said water injected being automatically increased with increases in temperature and automatically decreased with decreases in temperature until the temperature adjacent the input end falls below said predetermined level.

5. In a device for cleaning metal chips including a drum having an input end and an output end, transport means for conveying the metal chips from the input end to the output end; heat input means for heating the inside of the drum to cause the burning and vaporization of oils on said chips, the herein improvement comprising: an air input and exhaust means for causing an air stream to move in an opposed relationship with respect to the chip movement, said air stream carrying exhaust gases created from said burning and vaporization of oils out of said drum; a port disposed adjacent the output end of the drum; and an air sensing means associated with the port and said exhaust means, said air sensing means causing said exhaust means to increase the velocity of the exhaust gases flowing out from the device when the velocity of the air flowing through the port decreases below a predetermined level, said air sensing means causing said exhaust means to decrease the velocity of said exhaust gases flowing out from the device when the velocity of the air flowing through the port increases from the predetermined level.

6. The device of claim 5 wherein said exhaust means comprises an exhaust fan disposed adjacent the input end of the drum, the capacity of the exhaust fan being increased when the velocity through the port decreases, the capacity of the exhaust fan being decreased when the velocity through the port increases.

7. The device of claim 5 wherein said exhaust means includes an afterburner having a discharge stack, a damper disposed between the afterburner and stack, the opening of the damper being increased when the velocity through the port increases and the opening being decreased when the velocity through the port decreases.

8. The device of claim 5 wherein said exhaust means includes an afterburner having a discharge stack, a damper at the discharge end of the stack, the opening of the damper being decreased when the velocity through the port increases and the opening being increased when the velocity through the port decreases.

9. The device of claim 6 wherein a fan control means is associated with said sensing means and exhaust fan, said fan control means causing the speed of the exhaust fan to increase when increasing the capacity of the exhaust fan and the speed of the exhaust to decrease when decreasing the capacity of the exhaust fan.

10. The device of claim 6 wherein an exhaust fan damper controlling an air exhaust opening is associated with the exhaust fan; and a fan control means is associated with said air sensing means and the exhaust fan damper, said fan control means causing the damper to increase the air exhaust opening when increasing the capacity of the exhaust fan and to decrease the air exhaust opening when decreasing the capacity of the exhaust fan.

11. In a device for cleaning metal chips including a drum having an input end and an output end, transport means for conveying the metal chips from the input end to the output end, the herein improvement comprising: heat input means within the drum for heating the inside of the drum to cause the burning and vaporization of oils on said chips; an air input and exhaust means causing an air stream to move in an opposed relationship with respect to the chip movement, said air stream carrying exhaust gases created from said burning and vaporization of oil out of said drum; and heat control means for sensing temperature variations from a predetermined temperature level adjacent said input end, said heat control means being associated with the heat input means to cause the heat to vary and thereby return the temperature to said predetermined level, when the temperature at said input end varies from the predetermined level.

12. In a device for cleaning metal chips including a drum having an input end and an output end, an elongated spiral member having a plurality of fins for conveying the metal chips from the input end to the output end, heat input means for heating the inside of the drum to cause the burning and vaporization of oils on said chips, an air input and exhaust means for causing an air stream to remove exhaust gases, the herein improvement comprising: at least one bar member extending from one fin to an adjacent fin, said bar member causing tumbling of the metal chips into the air stream.

13. The device of claim 12 wherein said spiral member comprising a front portion, a rear portion and intermediate portion between the front and rear portions, said bar member only extending from adjacent fins in the intermediate portion of the spiral member.

14. In combustion apparatus of the type having a main combustion chamber for burning and vaporizing combustion material, feed means for delivering materials to said chamber, and an afterburner associated with said combustion chamber for withdrawing exhaust products from said chamber and for substantially completing combustion of said exhaust products, the improvement comprising means defining an afterburner chamber having an inlet end and an outlet end, an exhaust stack associated with said outlet end, variable intensity heating means for heating said afterburner chamber to a temperature at or above that necessary to produce combustion in said afterburner chamber, means for admitting secondary air to said afterburner chamber, stack temperature sensing means, and means responsive to variations in stack temperature above and below a predetermined level for increasing the amount of secondary air admitted to said afterburner chamber by said secondary air admitting means when the temperature is above said level and decreasing said amount when the temperature is below said level.

15. The structure of claim 14 characterized by and including additional means responsive to stack temperature sensing means for decreasing the intensity of the heat produced by the heating means when said stack temperature increases above a predetermined level.

16. The structure of claim 14 characterized by and including additional means responsive to the stack temperature for reducing the feed of combustible materials to said combustion chamber when said stack temperature increases above a predetermined amount.

17. In combustion apparatus for cleaning metal chips including means defining a main combustion chamber for burning and vaporizing combustible materials, feed means for delivering chip materials to said chamber, variable intensity heating means for said chamber and means for discharging chip material from said chamber, an afterburner associated with said combustion chamber for withdrawing exhaust products from said chamber and for substantially completing combustion of said exhaust products, said afterburner chamber having an inlet end and an outlet end, an exhaust stack associated with said outlet end, variable intensity heating means for heating said afterburner chamber to a temperature at or above that necessary to produce combustion in said afterburner chamber, means for admitting secondary air to said afterburner chamber, means for regulating a draft through said main combustion chamber and through said afterburner and stack to a predetermined velocity, first control means for regulating the temperature within said drum at a predetermined level, and second control means responsive to the temperature in said stack for regulating said afterburner temperature at a predetermined set level.

18. Combustion apparatus as set forth in claim 17 wherein said first control means for controlling the temperature in said drum includes means for sensing the temperature within said drum and means operated by said sensing means for delivering varying amounts of a cooling liquid to the interior of said drum to thereby control the temperature within said drum.

19. Combustion apparatus as set forth in claim 17 wherein said second control means includes means for sensing the temperature in a stack for said afterburner chamber, and means operated by said sensing means for controlling said variable intensity heating means and said secondary air admitting means to thereby maintain said afterburner temperature at or above that necessary to produce combustion, said means operated by said sensing means being effective to increase quantities of secondary air admitted in response to increases in stack temperature.

20. Combustion apparatus as set forth in claim 17 wherein said second control means includes means for reducing the feed rate of said feed means in response to an increase in said afterburner temperature above said predetermined set level.

21. In a device for cleaning metal chips including a drum having an input end and an output end, transport means for conveying the metal chips from the input end to the output end, heat input means for heating the inside of the drum to cause the burning and vaporization of oils on said chips, the herein improvement comprising: an air input and exhaust means for causing an air stream to move longitudinally within said drum, said air stream carrying exhaust gases created from said burning and vaporization of oils out of said drum, said exhaust means being associated with an input end of said drum, an afterburner means associated with said exhaust means, said afterburner means including means for heating exhaust gases to a temperature at or above the ignition temperature of the exhaust gases and secondary air input means, said afterburner also including an exhaust stack, and means responsive to variations in stack temperature above and below a predetermined level for increasing the amount of secondary air admitted to said afterburner chamber by said secondary air admitting means when the temperature is above said level and decreasing said amount when the temperature is below said level.

22. The structure of claim 21 characterized by and including additional means responsive to said stack temperature sensing means for decreasing the intensity of the heat produced by the heating means when said stack temperature increases above a predetermined level.

23. The structure of claim 21 characterized by and including additional means responsive to the stack temperature for reducing the feed of combustible materials to said combustion chamber when said stack temperature increases above a predetermined amount.

24. The structure of claim 21 characterized by and including means associated with said afterburner for regulating said air stream, and means for sensing the flow velocity of said air stream and operating said regulating means to maintain the velocity of said air stream at a predetermined selected level.

25. The structure of claim 21 characterized by and including means for regulating the temperature within the drum at a predetermined set level including means responsive to an increase in inside drum temperature above a predetermined level for reducing the intensity of heat from said heat input means.

26. The structure of claim 25 characterized by and including means for introducing cooling water to said drum in response to an increase in temperature within the drum above a predetermined set temperature.

References Cited

UNITED STATES PATENTS

| | | | |
|---|---|---|---|
| 2,082,970 | 6/1937 | Overman | 34—137 X |
| 2,104,040 | 1/1938 | Hurt | 34—137 X |
| 2,122,037 | 6/1938 | Lissauer | 34—24 |
| 2,244,035 | 6/1941 | Whitmore | 34—137 UX |
| 2,500,553 | 3/1950 | Lykken | 34—137 X |
| 3,346,417 | 10/1967 | Ehrlich | 134—2 |

EDWARD J. MICHAEL, Primary Examiner

U.S. Cl. X.R.

34—52, 56, 63, 137